United States Patent
Lin et al.

(10) Patent No.: US 10,693,226 B2
(45) Date of Patent: Jun. 23, 2020

(54) ELECTRONIC DEVICE, AND RADIO-FREQUENCY DEVICE AND SIGNAL TRANSMISSION COMPONENT THEREOF

(71) Applicant: WISTRON NEWEB CORPORATION, Hsinchu (TW)

(72) Inventors: Hsiao-Yi Lin, Hsinchu (TW); Kuan-Wei Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 94 days.

(21) Appl. No.: 16/128,857

(22) Filed: Sep. 12, 2018

(65) Prior Publication Data

US 2019/0165464 A1 May 30, 2019

(30) Foreign Application Priority Data

Nov. 29, 2017 (TW) .............................. 106141609 A

(51) Int. Cl.
*H01Q 1/50* (2006.01)
*H01Q 5/35* (2015.01)
(Continued)

(52) U.S. Cl.
CPC ................ *H01Q 1/50* (2013.01); *H01P 1/14* (2013.01); *H01Q 1/002* (2013.01); *H01Q 5/35* (2015.01); *H02H 9/046* (2013.01)

(58) Field of Classification Search
CPC .. H01Q 1/50; H01Q 5/35; H01Q 1/14; H01Q 1/002; H01Q 9/046
(Continued)

(56) References Cited

U.S. PATENT DOCUMENTS

| 5,914,693 A * | 6/1999 | Takei ...................... H01Q 13/16 343/700 MS |
| 9,455,489 B2 * | 9/2016 | Shiu ......................... H01Q 1/24 |

(Continued)

FOREIGN PATENT DOCUMENTS

| CN | 106129547 A | 11/2016 |
| JP | H0661882 A | 3/1994 |

(Continued)

*Primary Examiner* — Huedung X Mancuso
(74) *Attorney, Agent, or Firm* — Li & Cai Intellectual Property (USA) Office

(57) ABSTRACT

The present disclosure provides an electronic device, and a radio-frequency device and a signal transmission component thereof. The signal transmission component is operable in an operating frequency band and applied in a radio frequency device having a signal connector and a radio frequency circuit. The signal transmission component includes a signal transmission line and an electrostatic protection unit. The signal transmission line is disposed between the signal connector and the radio frequency circuit. The electrostatic protection unit is electrically connected to the signal transmission line, and includes a connecting end and a grounding end. An impedance of the electrostatic protection unit is greater than an impedance of the signal transmission line. An electrical length is defined between the connecting end and the grounding end, and the electrical length is less than ¼ of a wavelength corresponding to a lowest operating frequency within the operating frequency band.

18 Claims, 7 Drawing Sheets

(51) Int. Cl.
*H02H 9/04* (2006.01)
*H01Q 1/00* (2006.01)
*H01P 1/14* (2006.01)

(58) Field of Classification Search
USPC ........................................................ 343/850
See application file for complete search history.

(56) References Cited

U.S. PATENT DOCUMENTS

| | | | |
|---|---|---|---|
| 9,590,309 B2 * | 3/2017 | Hong | H01Q 9/0421 |
| 9,728,957 B2 | 8/2017 | Gao et al. | |
| 9,819,091 B2 * | 11/2017 | Fan | H01Q 13/10 |
| 10,020,571 B2 * | 7/2018 | Hogg | H01Q 1/42 |
| 2010/0231460 A1 * | 9/2010 | Chiang | H01Q 1/2258 |
| | | | 343/702 |

FOREIGN PATENT DOCUMENTS

| | | | |
|---|---|---|---|
| JP | 2007123740 A | 5/2007 | |
| JP | 2010165730 A | 7/2010 | |
| JP | 201265276 A | 3/2012 | |
| JP | 2014064258 A | 4/2014 | |
| JP | 2017184057 A | 10/2017 | |
| TW | 200847523 A | 12/2008 | |
| TW | 201044736 A1 | 12/2012 | |
| TW | 201328208 A1 | 7/2013 | |
| TW | 201419657 A | 5/2014 | |
| TW | M502971 U | 6/2015 | |

\* cited by examiner

ELECTRONIC DEVICE, AND RADIO-FREQUENCY DEVICE AND SIGNAL TRANSMISSION COMPONENT THEREOF

CROSS-REFERENCE TO RELATED PATENT APPLICATION

This application claims the benefit of priority to Taiwan Patent Application No. 106141609, filed on Nov. 29, 2017. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a device and a component for transmitting a radio-frequency signal, and more particularly to an electronic device, and a radio-frequency device and a signal transmission component thereof capable of enhancing the effectiveness of the electrostatic protection.

BACKGROUND OF THE DISCLOSURE

Since the susceptibility of a conventional RF front-end module (FEM) against electrostatic discharge (ESD) is poor, the RF chip will be susceptible to damage by the electrostatic discharge.

Next, in the conventional RF front-end module, in order to protect the chip (or circuit) on an RF circuit, most of the RF front-end modules are equipped with an electrostatic protection unit (e.g. transient voltage suppressor, TVS). However, since the operating frequency of the transmission signal transmitted on the RF signal transmission line is getting higher and higher, only the electrostatic protection unit with low stray capacitance (parasitic capacitance) can be selected. However, when the capacitance value of the selected electrostatic protection unit is lower, the effectiveness of the electrostatic protection is lower. For example, when the operating frequency ranges from 2 GHz to 6 GHz, only the 0.2 pF of the electrostatic protection unit may be selected. When the electrostatic discharge protection capability of the chip is too low, and the electrostatic protection unit with a lower capacitance value (e.g. 0.2 pF) is selected in order to transmit signals with a higher operating frequency, the electrostatic protection unit will be unable to provide effective electrostatic protection, so that the chip will still be damaged by the electrostatic discharge due to the lower electrostatic protection capability of the electrostatic protection unit with the lower capacitance value.

Further, although the electrostatic discharge protection capability of the electrostatic protection unit with higher capacitance value (parasitic capacitance) is better than the lower capacitance value, the electrostatic protection unit with higher capacitance value will cause the RF efficiency to be reduced. In the other words, the electrostatic protection unit with higher capacitance value may cause the high frequency signal to be transmitted directly to the ground, and cause the RF efficiency to be reduced significantly.

SUMMARY OF THE DISCLOSURE

In response to the above-referenced technical inadequacies, the present disclosure provides an electronic device, and a radio-frequency device and a signal transmission component thereof to enhance the effectiveness of electrostatic protection.

In one aspect, the present disclosure provides a radio frequency device operable in an operating frequency band, including a signal connector, a radio frequency circuit, a signal transmission line, and an electrostatic protection unit. The signal transmission line is disposed between the signal connector and the radio frequency circuit. The electrostatic protection unit is electrically connected to the signal transmission line, and the electrostatic protection unit includes a connecting end electrically connected with the signal transmission line, and a grounding end. An impedance of the electrostatic protection unit is greater than an impedance of the signal transmission line. An electrical length is defined between the connecting end and the grounding end, and the electrical length is less than ¼ of a wavelength corresponding to a lowest operating frequency within the operating frequency band.

In one aspect, the present disclosure provides a signal transmission component operable in an operating frequency band and applied in a radio frequency device having a signal connector and a radio frequency circuit. The signal transmission component includes a signal transmission line and an electrostatic protection unit. The signal transmission line is disposed between the signal connector and the radio frequency circuit. The electrostatic protection unit is electrically connected to the signal transmission line, and the electrostatic protection unit includes a connecting end electrically connected with the signal transmission line, and a grounding end. An impedance of the electrostatic protection unit is greater than an impedance of the signal transmission line. An electrical length is defined between the connecting end and the grounding end, and the electrical length is less than ¼ of a wavelength corresponding to a lowest operating frequency within the operating frequency band.

In one aspect, the present disclosure provides an electronic device using a radio frequency device, the radio frequency device being operable in an operating frequency band, the radio frequency device including a signal connector, a radio frequency circuit, a signal transmission line, and an electrostatic protection unit. The signal transmission line is disposed between the signal connector and the radio frequency circuit, the electrostatic protection unit is electrically connected to the signal transmission line, and the electrostatic protection unit includes a connecting end electrically connected with the signal transmission line, and a grounding end. An impedance of the electrostatic protection unit is greater than an impedance of the signal transmission line. An electrical length is defined between the connecting end and the grounding end, and the electrical length is less than ¼ of a wavelength corresponding to a lowest operating frequency within the operating frequency band. Therefore, one of the effects of the present disclosure is that the electronic device, and the radio-frequency device and the signal transmission component thereof as provided in the embodiments of the present disclosure can enhance the capability of the electrostatic discharge protection at least by the features of "an impedance of the electrostatic protection unit is greater than an impedance of the signal transmission line" and "an electrical length is defined between the connecting end and the grounding end, and the electrical length is less than ¼ of a wavelength corresponding to a lowest operating frequency within the operating frequency band".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
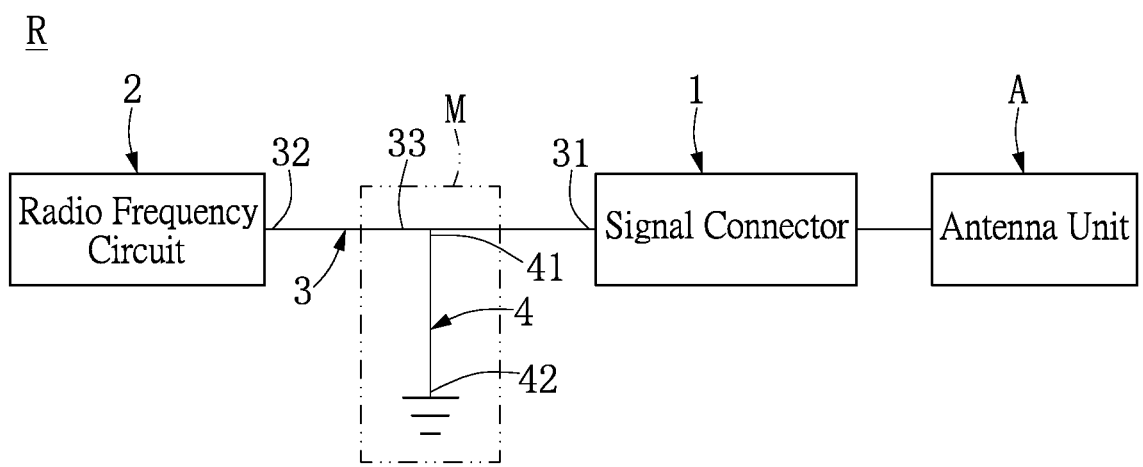
FIG. 1 is a functional block diagram of a radio frequency device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

First, reference is made to FIG. 1, where FIG. 1 is a functional block diagram of a radio frequency device according to a first embodiment of the present disclosure. The first embodiment of the present disclosure provides a radio frequency device R operable in an operating frequency band, including a signal connector 1, a radio frequency circuit 2, and a signal transmission component M. The signal transmission component M includes a signal transmission line 3 and an electrostatic protection unit 4, and provides an electrostatic discharge protection for the radio frequency device R through the electrostatic protection unit 4. For example, the bandwidth (BW) of the operating frequency band ranges from, but is not limited to, 2 GHz to 6 GHz to generate a corresponding signal transceiving effect. In addition, for example, the radio frequency circuit 2 can be, but not limited to, a radio frequency chip. However, it should be noted that, the present disclosure is not limited by the bandwidth range of the operating frequency band and the type of the signal connector 1, nor by the type of the radio frequency circuit 2.

Further, referring again to FIG. 1, in other implementations, the signal connector 1 can be used to connect an antenna or any conductive materials (e.g., a coaxial cable or an electrically conductive connector). For example, the radio frequency device R can further include an antenna unit A, and the signal connector 1 can be electrically connected to the antenna unit A to transmit the signal between the antenna unit A and the radio frequency circuit 2. Moreover, it should be noted that, in other implementations, the signal connector 1 may also be an end of the antenna unit A for connecting to the signal transmission component M.

Figure 2:
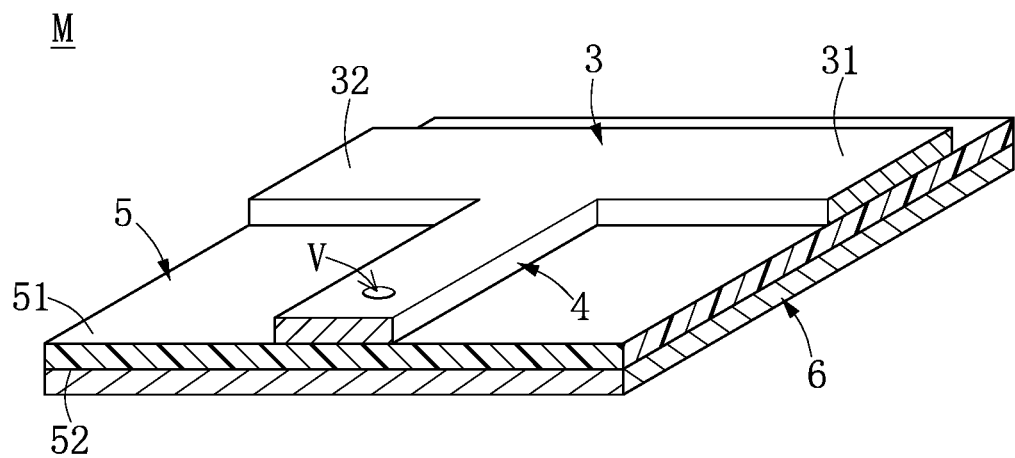
FIG. 2 is a perspective view of a signal transmission component according to the first embodiment of the present disclosure.
Figure 3:
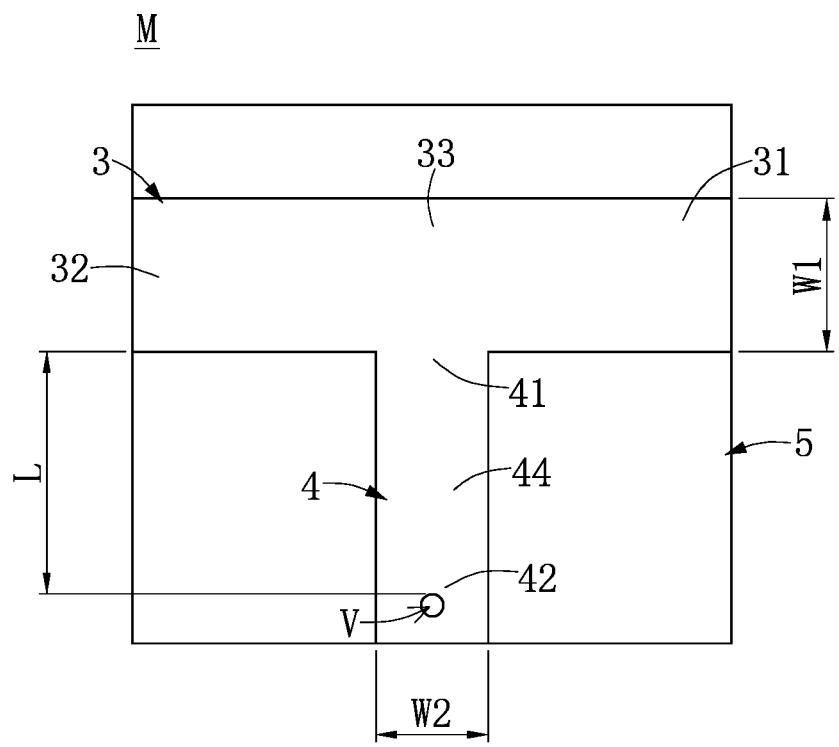
FIG. 3 is a top schematic view of a signal transmission component according to the first embodiment of the present disclosure.
Figure 4:
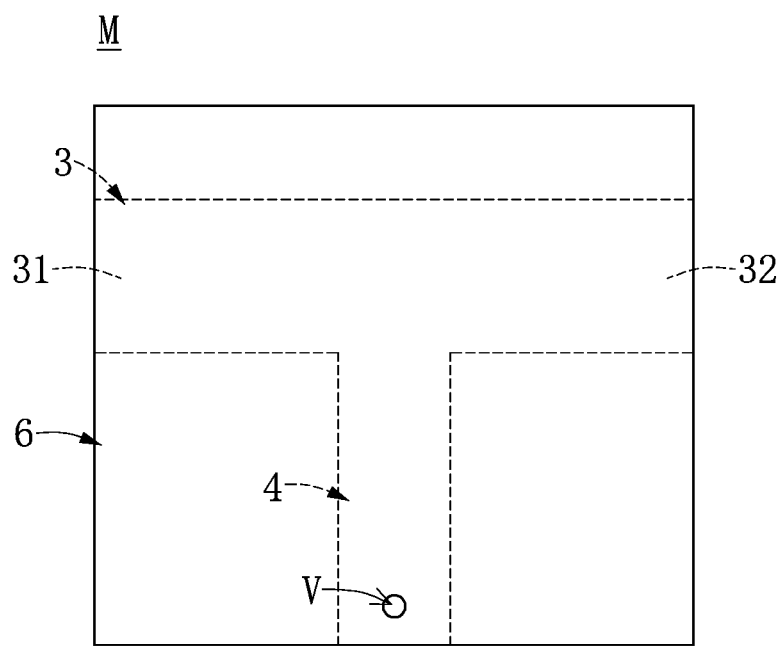
FIG. 4 is a bottom schematic view of a signal transmission component according to the first embodiment of the present disclosure.

Further, referring again to FIG. 1, and referring to FIG. 2 to FIG. 4, FIG. 2 is a perspective view of a signal transmission component according to the first embodiment of the present disclosure, FIG. 3 is a top schematic view of a signal transmission component according to the first embodiment of the present disclosure, and FIG. 4 is a bottom schematic view of a signal transmission component according to the first embodiment of the present disclosure. The signal transmission line 3 can be disposed between the signal connector 1 and the radio frequency circuit 2, and the signal transmission line 3 can include a first end 31, a second end 32 connected to the radio frequency circuit 2, and a connecting portion 33 disposed between the first end 31 and the second end 32. Furthermore, the electrostatic protection unit 4 can be electrically connected to the signal transmission line 3, and can include a connecting end 41 electrically connected to the signal transmission line 3, and a grounding end 42 opposite to the connecting end 41 and used for grounding. For example, the connecting end 41 of the electrostatic protection unit 4 can be connected to the connecting portion 33 of the signal transmission line 3. Moreover, preferably, in the embodiment of the present disclosure, an impedance of the electrostatic protection unit 4 is greater than an impedance of the signal transmission line 3.

Further, referring again to FIG. 2 to FIG. 4, for example, the radio frequency device R can further include a carrier board 5, and the signal transmission line 3 and the electrostatic protection unit 4 can be disposed on the carrier board 5. For example, in the first embodiment, the carrier board 5 can include a first surface 51 and a second surface 52 opposite to the first surface 51, and the signal transmission line 3 and the electrostatic protection unit 4 can be disposed on the first surface 51. Moreover, a grounded metal layer 6 (otherwise referred-to as a first grounded metal layer) is disposed on the second surface 52, and the grounding end 42 of the electrostatic protection unit 4 can be electrically connected to the grounded metal layer 6 to achieve the grounding effect. For example, a via hole V is disposed on the carrier board 5, and the via hole V can be electrically connected between the grounding end 42 of the electrostatic protection unit 4 and the grounded metal layer 6, and the grounding end 42 can be electrically connected to the grounded metal layer 6 through an electrical conductor (not shown in the figure) disposed in the via hole V. It should be noted that disposing an electrical conductor in the via hole V to allow two elements disposed on two opposite surfaces to be electrically connected is a well-known technique to those having ordinary skill in the art, and thus relevant details will be omitted for the sake for brevity. Moreover, in other implementations, the via hole V can be replaced by a conductive column. However, the present disclosure is not limited thereto.

In addition, referring again to FIG. 2 to FIG. 4, in the first embodiment, the electrostatic protection unit 4 is a grounding line 44, one end of the grounding line 44 is the connecting end 41 of the electrostatic protection unit 4, the other end of the grounding line 44 is the grounding end 42 of the electrostatic protection unit 4, and the material of the grounding line 44 and the material of the signal transmission line 3 are the same. Moreover, for example, the carrier board 5 can be a dielectric layer of a double-sided copper clad laminate prepared from FR-4. Therefore, the signal transmission line 3 and the electrostatic protection unit 4 can be the copper foil on one of the surfaces of the copper clad laminate, and the grounded metal layer 6 can be the copper foil on the other one of the surfaces of the copper clad laminate. In other words, the signal transmission line 3 can be a microstrip line, and the grounding line 44 can also be a microstrip line electrically connected between the signal transmission line 3 and the grounded metal layer 6. The material of the microstrip line can be a metal conductor. It should be noted that, in other implementations, the grounding line 44 can also be other kinds of iron wire, copper wire or coaxial cable, etc. However, the present disclosure is not limited thereto.

Further, referring again to FIG. 3 and FIG. 4, preferably, in the embodiment of the present disclosure, the grounding line 44 and the signal transmission line 3 are microstrip lines and have the same material. The impedance of the electrostatic protection unit 4 is greater than the impedance of the signal transmission line 3. That is to say, the impedance of the electrostatic protection unit 4 and the impedance of the signal transmission line 3 are different. For example, if the impedance of the signal transmission line 3 is 50 ohms, then the impedance of the electrostatic protection unit 4 is greater than 50 ohms and the greater the better. Moreover, in the first embodiment, in order to make the impedance of the electrostatic protection unit 4 greater than the impedance of the signal transmission line 3, in one of the implementations of the present disclosure, the width W2 of the electrostatic protection unit 4 is smaller than the width W1 of the signal transmission line 3. Moreover, in other implementations, the material of the electrostatic protection unit 4 and the material of the signal transmission line 3 can be different, and the impedance of the electrostatic protection unit 4 can be greater than the impedance of the signal transmission line 3. That is to say, in the first embodiment, the material of grounding line 44 and the material of signal transmission line 3 can be different from each other or can be the same as each other.

Furthermore, referring again to FIG. 3 and FIG. 4, an electrical length L is defined between the connecting end 41 and the grounding end 42, the electrical length L being less than ¼ of a wavelength corresponding to a lowest operating frequency within the operating frequency band. Preferably, in other implementations, the electrical length L is greater than ¹⁄₄₀ of the wavelength corresponding to the lowest operating frequency within the operating frequency band. For example, since the bandwidth of the operating frequency band of the embodiment of the present disclosure ranges from 2 GHz to 6 GHz, the electrical length L between the connecting end 41 and the grounding end 42 of the electrostatic protection unit 4 can be calculated with 2 GHz as a parameter, or with the dielectric coefficient of the copper clad laminate prepared from FR-4 as a parameter. Moreover, in the embodiment of the present disclosure, the dielectric coefficient of the copper clad laminate prepared from FR-4 can be 4.2 to 4.7. However, the present disclosure is not limited thereto. Moreover, it should be particularly noted that, in order to facilitate the presentation of the figures, the indicated positions of the first end 31, the second end 32, the connecting end 41, and the grounding end 42 are intended as illustrative only. The measuring position of the electrical length L is well known to those having ordinary skill in the art, and thus the relevant details will be omitted for the sake for brevity.

Further, as shown in FIG. 3, in the first embodiment, the distance of the electrical length L between the connecting end 41 and the grounding end 42 is the shortest distance from the connecting end 41 to the ground. In the other words, the electrical length L is from a connecting position between the electrostatic protection unit 4 and the signal transmission line 3 to a connecting position between the electrical conductor disposed in the via hole V and the grounded metal layer 6. That is to say, the thickness of the carrier board 5 should be considered when determining the electrical length L (the electrical length L shown in the figure is an approximation for illustrative purpose only, and does not represent the actual electrical length between the via hole V and the ground metal layer 6.

In continuation of the above, implementations with or without the inclusion of a carrier board 5 will be exemplarily described in the following. For example, in the implementation where the carrier board 5 is not provided and the parameter is 2 GHz, by calculating the calculation formula of $\lambda_0 = c/f$, the electrical length L between the connecting end 41 and the grounding end 42 of the electrostatic protection unit 4 can be obtained as being substantially less than 37.5 millimeter (mm) and substantially greater than 3.75 mm. It should be noted that "c" is the speed of light in the air, and "f" is 2 GHz. Moreover, for example, in the implementation where the carrier board 5 is provided and the parameter is 2 GHz, after calculating with the calculation formula of $\lambda_0 = c/f$, further calculation with the calculation formula of $\lambda_g = \lambda_0 / \sqrt{\varepsilon}$ can be performed. Therefore, the electrical length L between the connecting end 41 and the grounding end 42 of the electrostatic protection unit 4 can be obtained as being substantially less than 18.5 mm and substantially greater than 1.85 mm. It should be noted that, "$\varepsilon$" is the dielectric coefficient of the copper clad laminate prepared from FR-4, and the dielectric coefficient is 4.2 as an example. Moreover, "$\lambda_g$" is the wavelength of the signal transmitted on the carrier board 5. Preferably, in the present disclosure, the wavelength of the signal transmitted on the carrier board 5 is taken for example. In the other words, preferably, in the embodiment of the present disclosure, the ¼ of the wavelength corresponding to the lowest operating frequency within the operating frequency band is related to the dielectric coefficient of the carrier board 5.

Furthermore, in other implementations, the carrier board 5 can also be composed of two or more materials, therefore, the dielectric coefficient of each material should be considered when performing the calculations. It should be noted that, the calculation method of the wavelength of the dielectric coefficient of two or more materials is well known to those having ordinary skill in the art, and thus relevant details will be omitted for the sake for brevity.

Figure 5:
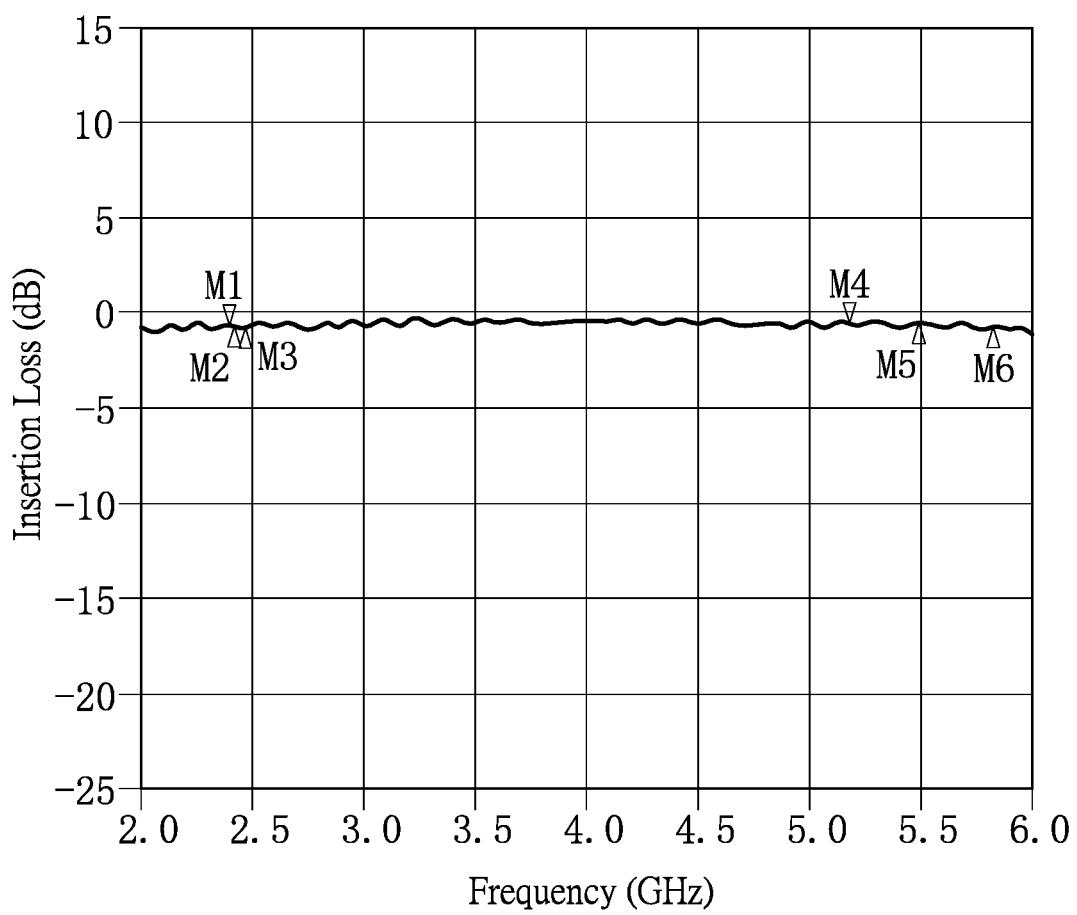
FIG. 5 is a curve diagram illustrating the insertion loss at various frequencies of a radio frequency device according to the first embodiment of the present disclosure.

Furthermore, referring to FIG. 5 and Table 1 shown below, FIG. 5 is a curve diagram illustrating the insertion loss at various frequencies of a radio frequency device according to the first embodiment of the present disclosure. Preferably, the impedance of the electrostatic protection unit 4 is, the better, and by adjusting the impedance of the electrostatic protection unit 4, the insertion loss can be smaller. Moreover, in the embodiment of the present disclosure, all of the insertion loss within the bandwidth range of the operating frequency band can be less than 3 dB, and preferably, less than 1 dB. Moreover, for example, in the embodiment of the present disclosure, when the bandwidth of the operating frequency band ranges from 2 GHz to 6 GHz, the distance between the connecting end 41 and the grounding end 42 of the electrostatic protection unit 4 can be between 3.75 mm and 37.5 mm (in an implementation where the carrier board 5 is not provided). Preferably, the distance between the connecting end 41 and the grounding end 42 of the electrostatic protection unit 4 can be between 1.85 mm and 18.5 mm (in an implementation where the carrier board 5 is provided). More preferably, the distance between the connecting end 41 and the grounding end 42 of the electrostatic protection unit 4 can be between 5 mm and 12 mm (in an implementation where the carrier board 5 is provided). However, the present disclosure is not limited thereto.

TABLE 1

| Node | Frequency (GHz) | Insertion Loss (dB) |
|---|---|---|
| M1 | 2.41 | −0.7146 |
| M2 | 2.42 | −0.7334 |
| M3 | 2.47 | −0.7984 |
| M4 | 5.18 | −0.5313 |
| M5 | 5.50 | −0.5626 |
| M6 | 5.83 | −0.7317 |

Second Embodiment

Figure 6:
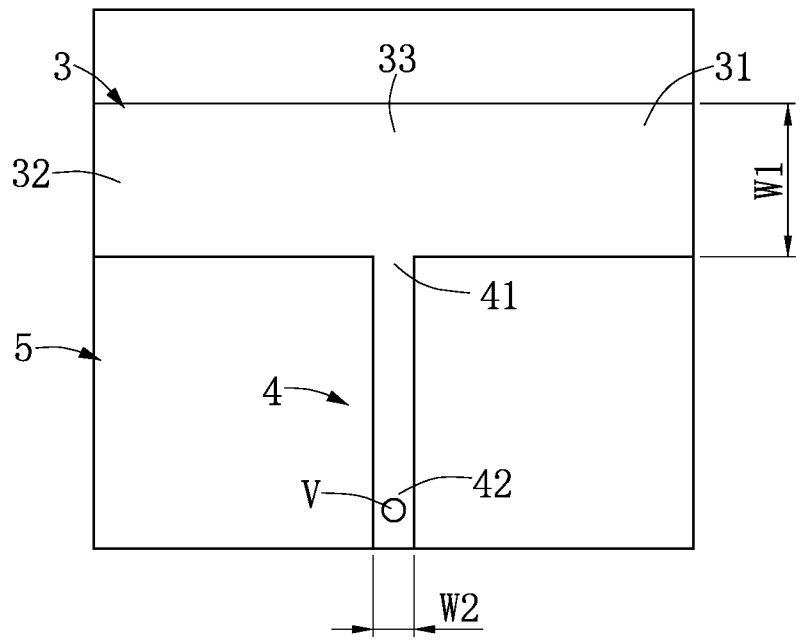
FIG. 6 is a top schematic view of a signal transmission component according to a second embodiment of the present disclosure.

Reference is made to FIG. 6, where FIG. 6 is a top schematic view of a signal transmission component according to a second embodiment of the present disclosure. In the comparison between FIG. 6 and FIG. 3, it can be seen that one of the differences in the second embodiment is that the width W2 of the electrostatic protection unit 4 can be significantly reduced to increase the impedance of the electrostatic protection unit 4. When the impedance of the electrostatic protection unit 4 is increased, the electric current flowing through the electrostatic protection unit 4 will be reduced, and the loss of the signal transmission line 3 can be reduced. It should be noted that other structural features of the signal transmission component M of the radio frequency device R as provided in the second embodiment are similar to that of the previous embodiment, thus relevant details are omitted for the sake of brevity.

Third Embodiment

Figure 7:
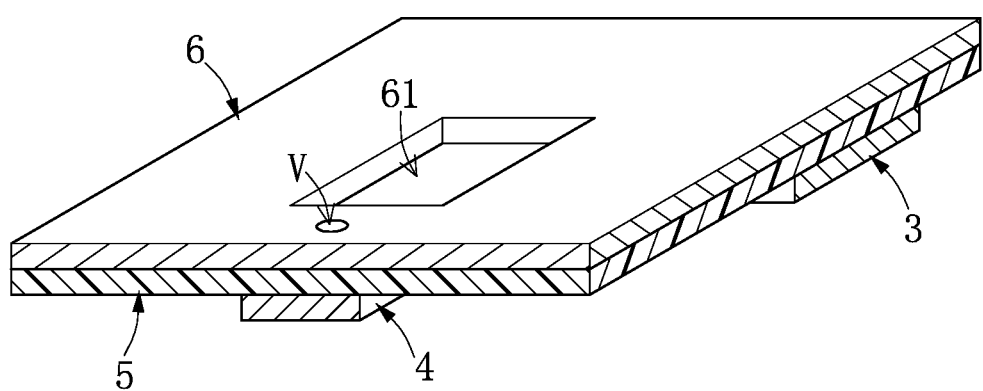
FIG. 7 is a perspective view of a signal transmission component according to a third embodiment of the present disclosure.

Reference is made to FIG. 7, where FIG. 7 is a perspective view of a signal transmission component according to a third embodiment of the present disclosure. In the comparison between FIG. 7 and FIG. 2, the main differences between the third embodiment and the first embodiment is that the grounded metal layer 6 of the signal transmission component M as provided in the third embodiment can further include a first hollow area 61. By virtue of the first hollow area 61, the second surface 52 of the carrier board 5 can be correspondingly exposed. Moreover, a vertical projection of the first hollow area 61 on the carrier board 5 and a vertical projection of the electrostatic protection unit 4 on the carrier board 5 at least partially overlap with each other. In other words, a vertical projection of the first hollow area 61 and a vertical projection of the electrostatic protection unit 4 on the first surface 51 (or the second surface 52) of the carrier board 5 at least partially overlap with each other. Therefore, the parasitic capacitance will be reduced, and the impedance of the electrostatic protection unit 4 will be increased.

Figure 8:
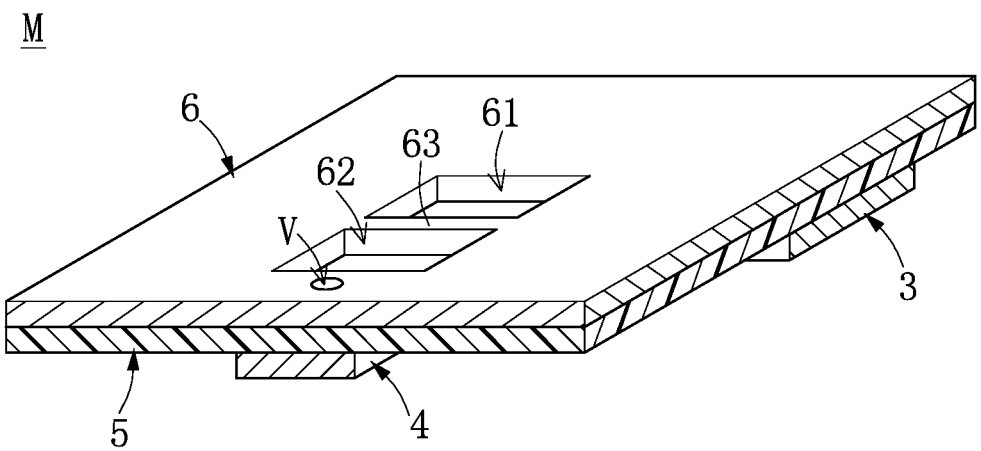
FIG. 8 is another perspective view of a signal transmission component according to the third embodiment of the present disclosure.

Next, reference is made to FIG. 8, where FIG. 8 is another perspective view of a signal transmission component according to the third embodiment of the present disclosure. In a comparison between FIG. 8 and FIG. 7, the main differences between FIG. 8 and FIG. 7 is that the grounded metal layer 6 as provided in FIG. 8 further includes a second hollow area 62. A spacer 63 is between the first hollow area 61 and the second hollow area 62, and a vertical projection of the second hollow area 62 on the carrier board 5 and a vertical projection of the electrostatic protection unit 4 on the carrier board 5 at least partially overlap with each other. In other words, a vertical projection of the first hollow area 61 and the second hollow area 62 at least partially overlap with a vertical projection of the electrostatic protection unit 4 on the first surface 51 (or the second surface 52) of the carrier board 5, respectively. Therefore, the parasitic capacitance will be reduced, and the impedance of the electrostatic protection unit 4 will be increased. It is worth noting that, the advantage of further forming the second hollow area 62 is that the radiation effect and noise absorption effect (absorbing the signals outside the operating frequency band) of the electrostatic protection unit 4 can be reduced. Moreover, other structural features of the signal transmission component M of the radio frequency device R as provided in the third embodiment are similar to that of the previous embodiments, thus relevant details are omitted for the sake of brevity.

Fourth Embodiment

Figure 9:
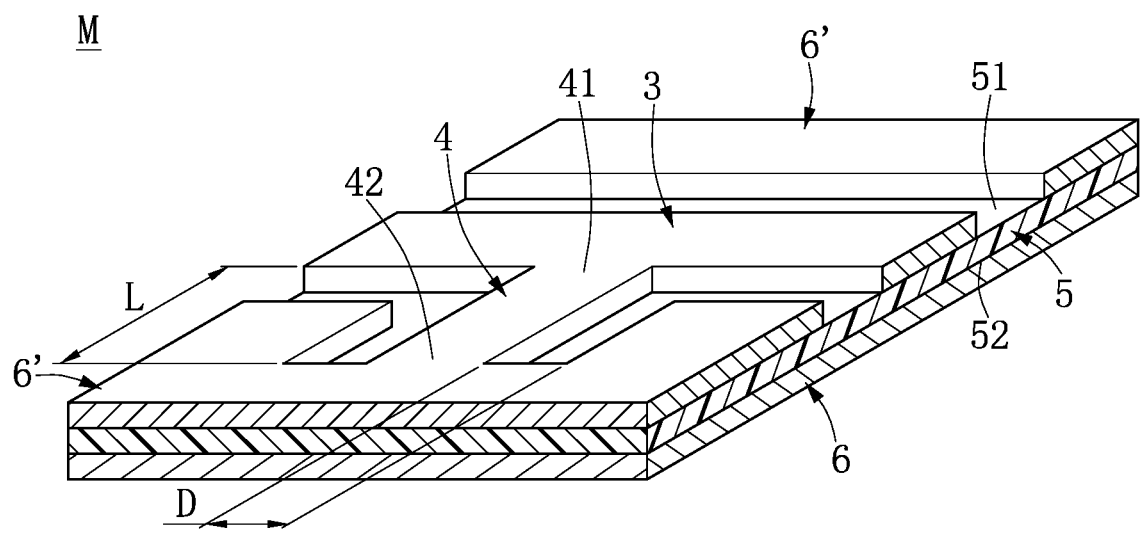
FIG. 9 is a perspective view of a signal transmission component according to a fourth embodiment of the present disclosure.

First, reference is made to FIG. 9, where FIG. 9 is a perspective view of a signal transmission component according to a fourth embodiment of the present disclosure. In a comparison between FIG. 9 and FIG. 2, the main differences between the fourth embodiment and the first embodiment is that the grounding end 42 of the electrostatic protection unit 4 of the signal transmission component M as provided in the fourth embodiment can be electrically connected to a grounded metal layer 6' (otherwise referred-to as a second grounded metal layer) disposed on the first surface 51 of the carrier board 5.

Further, referring again to FIG. 9, in other implementations, the grounded metal layer 6' disposed on the first surface 51 of the carrier board 5 can also provided with a via hole (not shown in the figure, it can be the via hole V as described in the previous embodiments) to be electrically connected to the grounded metal layer 6 disposed on the second surface 52 of the carrier board 5. A separating distance D is formed between a longitudinal side (not labeled in the figure) of the electrostatic protection unit 4 and the grounded metal layer 6' disposed on the first surface 51 of the carrier board 5. Moreover, in the fourth embodiment, in order to increase the impedance of the electrostatic protection unit 4, the distance between the electrostatic protection unit 4 and the grounded metal layer 6' disposed on the carrier board 5 can be adjusted. That is to say, the separating distance D between the electrostatic protection unit 4 and the grounded metal layer 6' can be increased to reduce the parasitic capacitance, and the impedance of the electrostatic protection unit 4 will be increased. Moreover, in other implementations, it is also possible to further provide the first hollow area 61 and/or the second hollow area 62 on the grounded metal layer 6 which is on the second surface 52 to reduce the parasitic capacitance, and the impedance of the electrostatic protection unit 4 will be increased. That is to say, a first grounded metal layer (grounded metal layer 6) is disposed on the second surface 52, a second grounded metal layer (grounded metal layer 6') is disposed on the second surface 52, and the grounding end 42 of the electrostatic protection unit 4 is electrically connected to the first grounded metal layer and the second grounded metal layer. Moreover, the first grounded metal layer includes a first hollow area 61, and a vertical projection of the first hollow area 61 on the carrier board 5 and a vertical projection of the electrostatic protection unit 4 on the carrier board 5 at least partially overlap with each other, and a separating distance D is formed between a side of the electrostatic protection unit 4 and the second grounded metal layer. Moreover, it should be noted that other structural features of the signal transmission component M of the radio frequency device R as provided in the fourth embodiment are similar to that of the previous embodiments, thus relevant details are omitted for the sake of brevity.

Furthermore, it is worth noting that, in the fourth embodiment, the distance of the electrical length L between the connecting end 41 and the grounding end 42 is the shortest distance from the connecting end 41 to the ground. That is to say, the electrical length L is from a connecting position between the connecting end 41 of the electrostatic protection unit 4 and the signal transmission line 3 to a connecting position between the grounding end 42 and the grounded metal layer 6'. However, it should be noted that, when the fourth embodiment includes via hole V as provided in the previous first embodiment, the electrical length L is the shortest distance from the connecting end 41 to the ground.

In addition, it is worth noting that, in the fourth embodiment, by virtue of the grounded metal layer 6', the adjustment parameters of the signal transmission line 3 can be increased. For example, the parasitic capacitance of the signal transmission line 3 can be further adjusted for adjusting the impedance of the signal transmission line 3. Furthermore, by virtue of the grounded metal layer 6', the electromagnetic compatibility (EMC) of the signal transmission line 3 and the electrostatic protection unit 4 can be improved. For example, the risk of interference of the signal transmission line 3 and the electrostatic protection unit 4 can be reduced, and the radiation effect of the signal transmission line 3 and the electrostatic protection unit 4 can be reduced.

Fifth Embodiment

Figure 10:
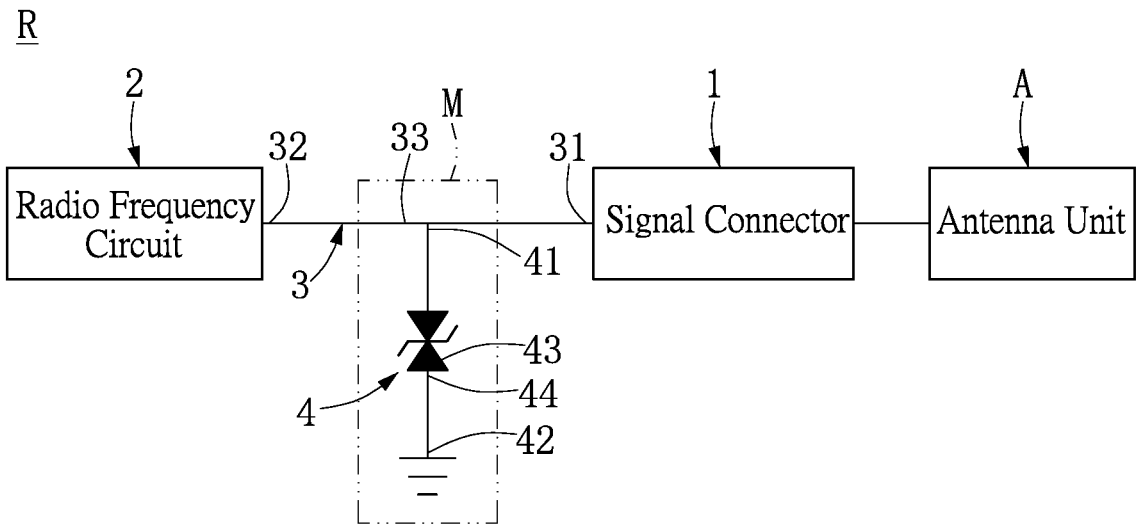
FIG. 10 is a functional block diagram of a radio frequency device according to a fifth embodiment of the present disclosure.
Figure 11:
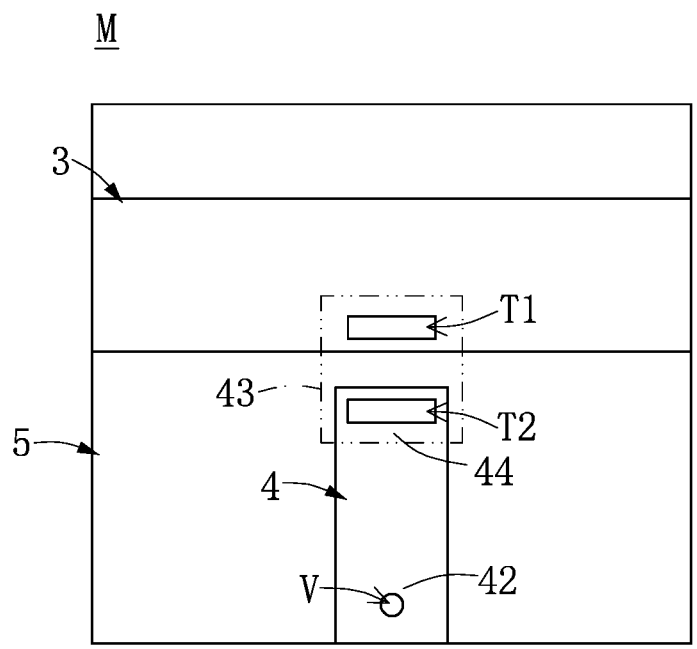
FIG. 11 is a top schematic view of a signal transmission component according to the fifth embodiment of the present disclosure.

First, reference is made to FIG. 10 and FIG. 11, where FIG. 10 is a functional block diagram of a radio frequency device according to a fifth embodiment of the present disclosure, and FIG. 11 is a top schematic view of a signal transmission component according to the fifth embodiment of the present disclosure. In a comparison between FIG. 10 and FIG. 1, the main differences between the fifth embodiment and the first embodiment is that the electrostatic protection unit 4 can includes a transient voltage suppressor element 43 and a grounding line 44 electrically connected to the transient voltage suppressor element 43, and the transient voltage suppressor element 43 and the grounding line 44 are connected in series with each other. In other words, referring again to FIG. 10, the transient voltage suppressor element 43 can be disposed between the connecting end 41 and the grounding end 42.

Further, referring again to FIG. 10 and FIG. 11, for example, the transient voltage suppressor element 43 can be a transient voltage suppressor (TVS), the material of the grounding line 44 and the material of the signal transmission line 3 can be the same, and the grounding line 44 can be a microstrip line electrically connected between the signal transmission line 3 and the grounded metal layer 6. However, the present disclosure is not limited thereto. Moreover, it is worth noting that in one of the implementations, as shown in FIG. 11, the connecting portion 33 of the signal transmission line 3 can further include a bonding area T1, the grounding line 44 can further include a bonding area T2, and the signal transmission line 3 and the grounding line 44 are separated from each other by a predetermined distance. Furthermore, the transient voltage suppressor element 43 can be electrically connected between the bonding area T1 of the signal transmission line 3 and the bonding area T2 of the grounding line 44. Moreover, it is worth noting that, in the fifth embodiment, the transient voltage suppressor element 43 of the electrostatic protection unit 4 can be a transient voltage suppression diode with higher capacitance (the capacitance can be, but is not limited to, 0.5 pF).

Furthermore, it should be noted that, in the fifth embodiment, the electrical length L is from a connecting position between the transient voltage suppressor element 43 and the bonding area T1 of the signal transmission line 3 to the grounding end 42 disposed on the grounding line 44. Moreover, it should be noted that other structural features of the signal transmission component M of the radio frequency device R as provided in the fifth embodiment are similar to that of the previous embodiments, thus relevant details are omitted for the sake of brevity.

Sixth Embodiment

Figure 12:
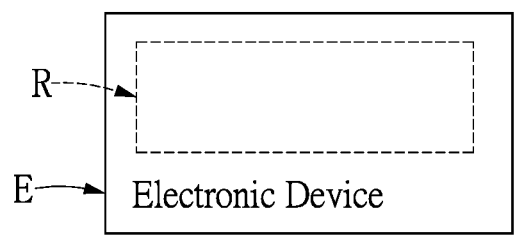
FIG. 12 is a top schematic view of an electronic device according to a sixth embodiment of the present disclosure.

Reference is made to FIG. 12, where FIG. 12 is a top schematic view of an electronic device according to a sixth embodiment of the present disclosure. The radio frequency device R as provided in the embodiment of the present disclosure can be applied in an electronic device E. For example, the electronic device E can be a smart phone, a tablet or a laptop, etc. That is to say, the radio frequency device R as provided in the embodiment of the present disclosure can be applied in an electronic device E that requires wireless communication. Moreover, it should be noted that other structural features of the signal transmission component M of the radio frequency device R as provided in the sixth embodiment are similar to that of the previous embodiments, thus relevant details are omitted for the sake of brevity.

Effects of the Embodiments

One of the effects is that the electronic device, and the radio-frequency device and the signal transmission component thereof as provided in the embodiments of the present disclosure can enhance the capability of the electrostatic discharge protection at least by the features of "an impedance of the electrostatic protection unit is greater than an impedance of the signal transmission line" and "an electrical length is defined between the connecting end and the grounding end, and the electrical length is less than ¼ of a wavelength corresponding to a lowest operating frequency within the operating frequency band". Further, through the above technical features, the difference in the insertion loss between the low frequency and high frequency (e.g. from 2 GHz to 6 GHz) can be reduced. With the embodiments described above as an example, all of the insertion loss within the bandwidth range of the operating frequency band can be less than 3 dB. That is to say, compared with the related art, the embodiment of the present disclosure can further be operated normally in all frequency ranges between 2 GHz and 6 GHz. Furthermore, it can also be applied to products of smaller size.

Further, another effect of the present disclosure is that when the electrostatic protection unit 4 includes a transient voltage suppressor element 43 and a grounding line 44, the transient voltage suppressor element 43 can select a transient voltage suppression diode with higher capacitance (the capacitance can be, but is not limited to, 0.5 pF) by the features of "an impedance of the electrostatic protection unit is greater than an impedance of the signal transmission line" and "an electrical length is defined between the connecting end and the grounding end, and the electrical length is less than ¼ of a wavelength corresponding to a lowest operating frequency within the operating frequency band". Therefore, the problem of being unable to use electrostatic protection units with higher capacitance while the radio frequency device is operating in high frequency in the related art can be solved. Furthermore, when the electrostatic discharge effect originates from the earth, the voltage can be clamped through the inclusion of the transient voltage suppressor element 43 to achieve effective electrostatic protection.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A radio frequency device operable in an operating frequency band, comprising:
    a signal connector;
    a radio frequency circuit;
    a signal transmission line disposed between the signal connector and the radio frequency circuit;
    an electrostatic protection unit that is electrically connected to the signal transmission line, and that includes a connecting end electrically connected with the signal transmission line, and a grounding end; and
    a carrier board, the signal transmission line and the electrostatic protection unit are disposed on the same surface of the carrier board;
    wherein an impedance of the electrostatic protection unit is greater than an impedance of the signal transmission line;
    wherein an electrical length is defined between the connecting end and the grounding end, and the electrical length is less than ¼ of a wavelength corresponding to a lowest operating frequency within the operating frequency band; and
    wherein the grounding end of the electrostatic protection unit is electrically connected to the grounded metal layer, and wherein a separating distance is between the electrostatic protection unit and the grounded metal layer.

2. The radio frequency device according to claim 1, wherein the electrical length is greater than ¹⁄₄₀ of the wavelength corresponding to the lowest operating frequency within the operating frequency band.

3. The radio frequency device according to claim 1, further comprising a carrier board, the signal transmission line and the electrostatic protection unit being disposed on the carrier board, wherein the carrier board includes a first surface and a second surface opposite to the first surface, the electrostatic protection unit is disposed on the first surface, a grounded metal layer is disposed on the second surface, and the grounding end of the electrostatic protection unit is electrically connected to the grounded metal layer, and wherein the grounded metal layer includes a first hollow area, and a vertical projection of the first hollow area on the carrier board and a vertical projection of the electrostatic protection unit on the carrier board at least partially overlap with each other.

4. The radio frequency device according to claim 3, wherein the grounded metal layer further includes a second hollow area, a spacer is between the first hollow area and the second hollow area, and a vertical projection of the second hollow area on the carrier board and a vertical projection of the electrostatic protection unit on the carrier board at least partially overlap with each other.

5. The radio frequency device according to claim 1, wherein the material of the signal transmission line and the material of the electrostatic protection unit are the same, and a width of the electrostatic protection unit is smaller than a width of the signal transmission line.

6. The radio frequency device according to claim 1, wherein the electrostatic protection unit includes a transient voltage suppressor element and a grounding line electrically connected to the transient voltage suppressor element, and the transient voltage suppressor element and the grounding line are connected in series with each other.

7. The radio frequency device according to claim 1, wherein the electrostatic protection unit is a grounding line, one end of the grounding line is the connecting end, the other end of the grounding line is the grounding end, and the material of the grounding line and the material of the signal transmission line are the same.

8. The radio frequency device according to claim 1, wherein the ¼ of the wavelength corresponding to the lowest operating frequency within the operating frequency band is related to a dielectric coefficient of the carrier board.

9. A signal transmission component operable in an operating frequency band and applied in a radio frequency device having a signal connector and a radio frequency circuit, the signal transmission component comprising:
   a signal transmission line disposed between the signal connector and the radio frequency circuit;
   an electrostatic protection unit that is electrically connected to the signal transmission line, and that includes a connecting end electrically connected with the signal transmission line, and a grounding end; and
   a carrier board, the signal transmission line and the electrostatic protection unit are disposed on the carrier board;
   wherein an impedance of the electrostatic protection unit is greater than an impedance of the signal transmission line;
   wherein an electrical length is defined between the connecting end and the grounding end, and the electrical length is less than ¼ of a wavelength corresponding to a lowest operating frequency within the operating frequency band; and
   wherein the ¼ of the wavelength corresponding to the lowest operating frequency within the operating frequency band is related to a dielectric coefficient of the carrier board.

10. The radio frequency device according to claim 9, wherein the electrical length is greater than ¹⁄₄₀ of the wavelength corresponding to the lowest operating frequency within the operating frequency band.

11. The radio frequency device according to claim 9, wherein the material of the signal transmission line and the material of the electrostatic protection unit are the same, and a width of the electrostatic protection unit is smaller than a width of the signal transmission line.

12. The radio frequency device according to claim 9, wherein the electrostatic protection unit includes a transient voltage suppressor element and a grounding line electrically connected to the transient voltage suppressor element, and the transient voltage suppressor element and the grounding line are connected in series with each other.

13. The radio frequency device according to claim 9, wherein the material of the electrostatic protection unit and the material of the signal transmission line are different.

14. An electronic device using a radio frequency device, the radio frequency device operable in an operating frequency band, the radio frequency device includes a signal connector, a radio frequency circuit, a signal transmission line, an electrostatic protection unit, and a carrier board, wherein the signal transmission line is disposed between the signal connector and the radio frequency circuit, the electrostatic protection unit that is electrically connected to the signal transmission line, and the electrostatic protection unit includes a connecting end electrically connected with the signal transmission line, and a grounding end, and the signal transmission line and the electrostatic protection unit are disposed on the same surface of the carrier board;
   wherein an impedance of the electrostatic protection unit is greater than an impedance of the signal transmission line;
   wherein an electrical length is defined between the connecting end and the grounding end, and the electrical length is less than ¼ of a wavelength corresponding to a lowest operating frequency within the operating frequency band; and
   wherein the grounding end of the electrostatic protection unit is electrically connected to the grounded metal layer, and wherein a separating distance is between the electrostatic protection unit and the grounded metal layer.

15. The radio frequency device according to claim 14, wherein the electrical length is greater than ¹⁄₄₀ of the wavelength corresponding to the lowest operating frequency within the operating frequency band.

16. The radio frequency device according to claim 14, wherein the material of the signal transmission line and the material of the electrostatic protection unit are the same, and a width of the electrostatic protection unit is smaller than a width of the signal transmission line.

17. The radio frequency device according to claim 14, wherein the electrostatic protection unit includes a transient voltage suppressor element and a grounding line electrically connected to the transient voltage suppressor element, and the transient voltage suppressor element and the grounding line are connected in series with each other.

18. The radio frequency device according to claim 14, wherein the ¼ of the wavelength corresponding to the lowest operating frequency within the operating frequency band is related to a dielectric coefficient of the carrier board.

\* \* \* \* \*